Nov. 3, 1964     S. H. RASKIN     3,155,184
WEIGHING APPARATUS
Filed Sept. 27, 1962     3 Sheets-Sheet 2

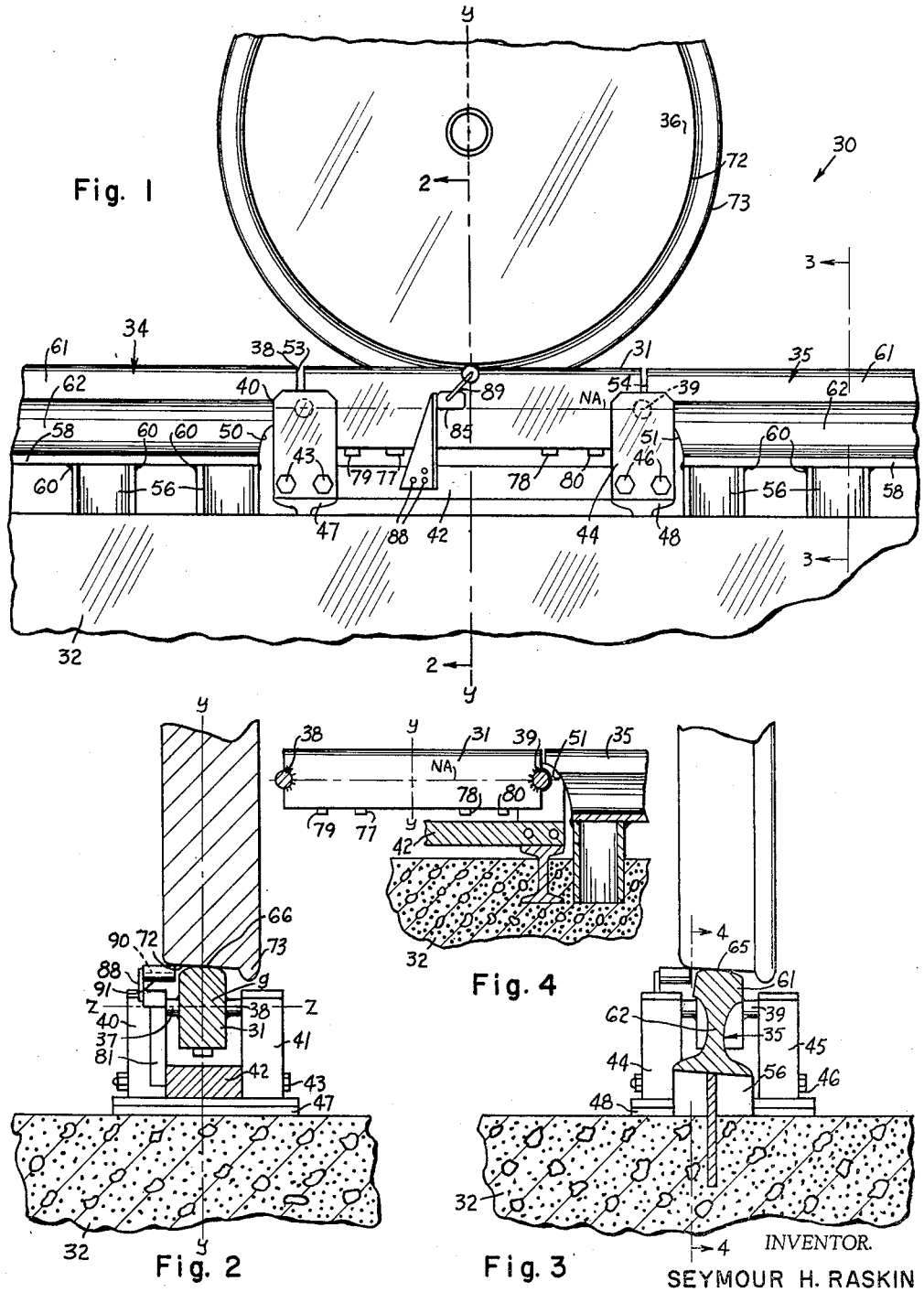

INVENTOR.
SEYMOUR H. RASKIN
BY *Hastings Ackley*
*Walter J Jay*

Nov. 3, 1964　　　　　S. H. RASKIN　　　3,155,184
WEIGHING APPARATUS
Filed Sept. 27, 1962　　　　　　　　　3 Sheets-Sheet 3
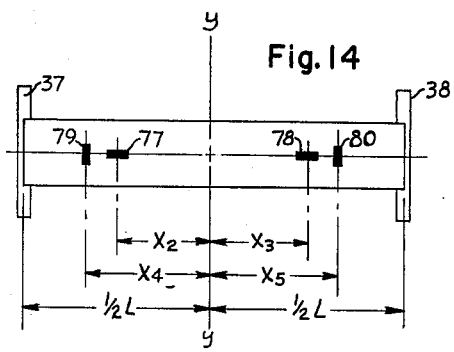
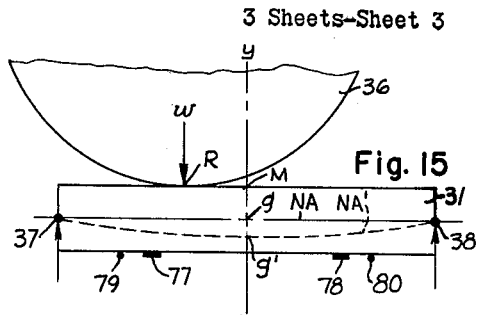
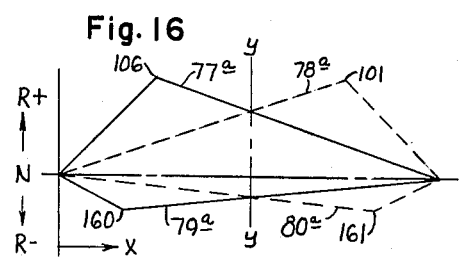
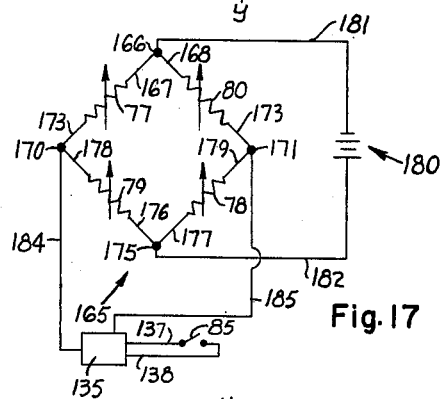
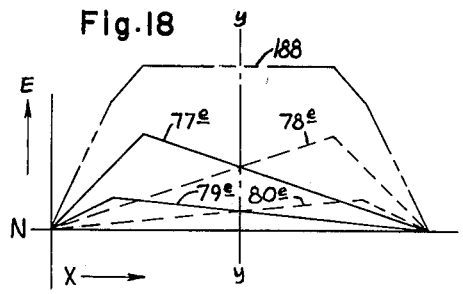
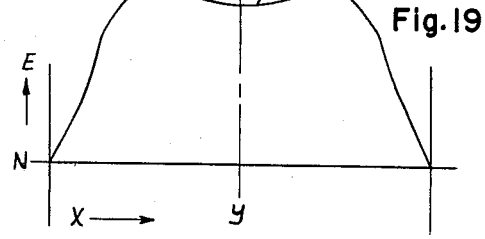
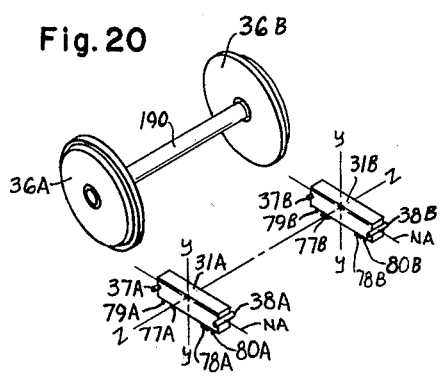
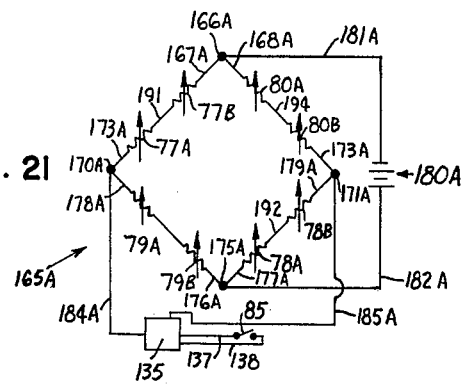
INVENTOR.
SEYMOUR H. RASKIN
BY

United States Patent Office 3,155,184
Patented Nov. 3, 1964

3,155,184
WEIGHING APPARATUS
Seymour H. Raskin, Dallas, Tex., assignor to Sands Measurement Corporation, Dallas, Tex., a corporation of Texas
Filed Sept. 27, 1962, Ser. No. 226,514
13 Claims. (Cl. 177—163)

This invention relates to weighing apparatus and more particularly to a weighing apparatus for weighing moving loads.

An object of this invention is to provide a new and improved apparatus for weighing moving loads having a beam supported at longitudinally spaced locations and means for measuring the strain or deflection of the beam as the load moves over the beam between the spaced locations.

Another object is to provide an apparatus for weighing moving loads wherein the strain or vertical deflection of the beam due to the load is measured at the time that the load is at a point along the beam wherein the vertical deflection of the beam is proportional to the weight of the load and extraneous forces have no or minimal effect upon the vertical deflection of the beam or the effects of such extraneous forces are balanced or compensated by the strain measuring means.

Still another object is to provide a weighing apparatus including a beam supported at longitudinally spaced locations and having a plurality of sensor means spaced equidistantly from the midpoint of the span of the beam for measuring the strain or deflection of the beam due to the vertical force applied to the beam by the load as it moves over the beam and at the time it is at the midpoint of the span.

A further object is to provide a weighing apparatus wherein the sensor means include strain gauges secured to the bottom of the beam on opposite sides of the midpoint of the beam and whose resistance, which varies with the strain imposed on the beam by the moving load, is sensed at the time the load is equidistant between the strain gauges whereby the change in the combined resistances of the strain gauges is proportional only to the vertical force of the load on the beam and is not affected by forces acting on the beam in directions other than the vertical.

A still further object is to provide a weighing apparatus wherein the beam is provided with means cooperable with the load measuring strain gauges for compensating for changes in the physical chracteristics of the weigh rail due to temperature changes.

Another object of the invention is to provide a weighing apparatus for weighing moving loads, such as railroad vehicles moving over a pair of parallel railroad track rails, wherein the apparatus includes a pair of parallel weigh rails constituting sections of the pair of track rails and wherein each weigh rail is supported at longitudinally spaced locations, whereby each weigh rail deflects downwardly as the pair of wheels on each axle of the railway vehicle moves over the weigh rails, and strain or deflection sensing devices, such as strain gauges, disposed on opposite sides of the midpoint of the span of each weigh rail electrically connected in a circuit to provide an electrical characteristic which varies with the weight of the load imposed on the weigh rails by the wheels.

Another object is to provide a weighing apparatus wherein the electric circuit includes means for determining the electric characteristics of the strain or deflection sensing devices, such as strain gauges, at the time that the wheels move over the midpoints of the spans of the two weigh rails.

Still another object is to provide a weighing apparatus wherein the weigh rail strain or deflection sensing devices are so disposed relative to the weigh rails that the value of their electrical characteristics, such as the resistance of a strain gauge, is not affected by the local effect of the load on the beam since the electric characteristic of such sensing device is measured at the time the load is longitudinally spaced from the sensing device.

Additional objects and advantages of the invention will be readily apparent from the reading of the following description of a device constructed in accordance with the invention, and reference to the accompanying drawings, wherein:

FIGURE 1 is a side elevation of the weighing apparatus embodying the invention showing the weigh beam as a weigh rail constituting a section of a track rail and showing the wheel of a railroad vehicle as it moves past the midpoint of the span of the weigh rail;

FIGURE 2 is a cross-sectional view taken on line 2—2 of FIGURE 1;

FIGURE 3 is a cross-sectional view taken on line 3—3 of FIGURE 1;

FIGURE 4 is a cross-sectional view taken on line 4—4 of FIGURE 3;

Figure 5:
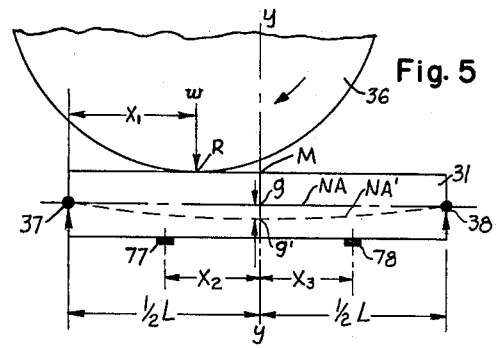
FIGURE 5 is a diagrammatic illustration of a beam or rail having a pair of strain gauges bonded to the bottom surface thereof and of a wheel rolling thereover showing the manner in which a vertical force is exerted on the beam by the wheel.
Figure 6:
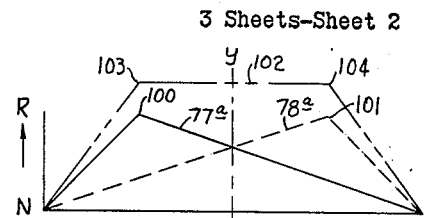

FIGURE 6 is a diagram showing the theoretical strains of the beam of FIGURE 5 at the points of location of the strain gauges caused by the vertical force imposed on the beam by a load moving thereover and also the combined strain sensed by the two strain gauges at these points as the load moves over the beam, the diagram showing the changes in the strains or changes in the resistances of the strain gauges.

Figure 7:
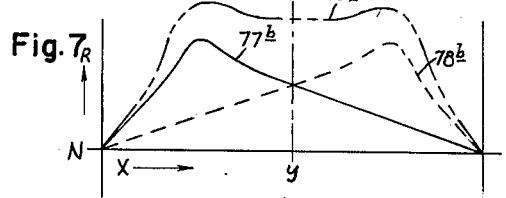
Figure 8:
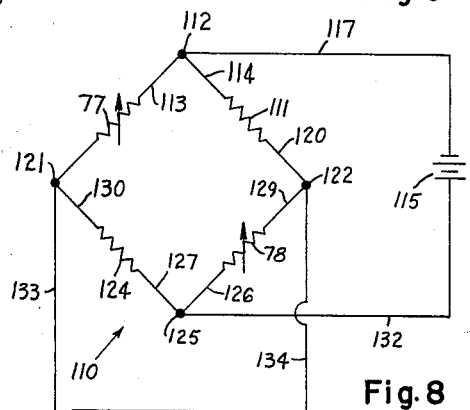
Figure 9:
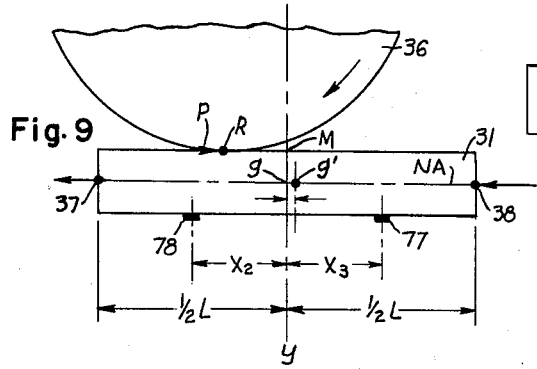
Figure 10:
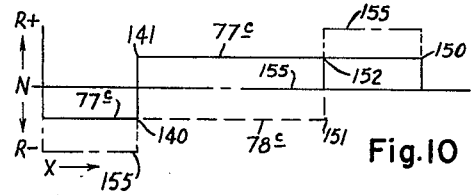
Figure 11:
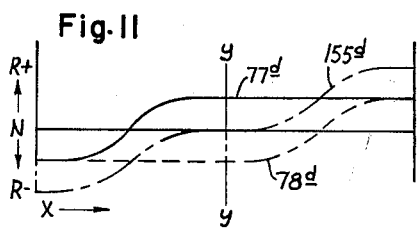
Figure 12:
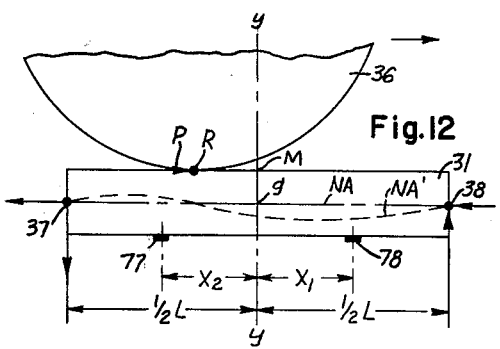
Figure 13:
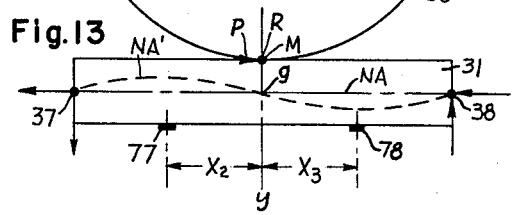

FIGURE 7 is a diagram similar to the diagram of FIGURE 6 showing the actual strains at the points of location of the strain gauges imposed on the beam by the vertical force of a load moving thereover and the actual combined strain sensed by the two strain gauges;

FIGURE 8 is a schematic diagram of the electric circuit including the strain gauges of the apparatus of FIGURE 5 for producing an output voltage which varies in accordance with the weight of the load rolling over the beam and the means for measuring the output of the bridge and indicating the weight of the load at the time that the moving load is at the midpoint of the span of the beam;

FIGURE 9 is a diagrammatic illustration of a beam or rail having a pair of strain gauges bonded to the bottom surface thereof and of a wheel rolling thereover showing the way in which axially longitudinally acting forces are exerted on the beam by a wheel as it rolls thereover;

FIGURE 10 is a diagram showing the theoretical strains, at the points of location of the strain gauges of the beam illustrated in FIGURE 9 as the wheel rolls over the beam, caused by the longitudinal forces exerted on the rail by the wheel, the diagram showing the changes in the strains or changes in the resistances of the strain gauges;

FIGURE 11 is a diagram similar to the diagram of FIGURE 10 showing the actual strains sensed by the strain gauges and the actual combined strain sensed by the two strain gauges;

FIGURE 12 is a diagrammatic illustration of a beam having a pair of strain gauges bonded to the bottom surface thereof and of a wheel rolling thereover showing the manner in which longitudinal bending forces are exerted on the beam by a wheel rolling over the beam toward the midpoint of the span thereof;

FIGURE 13 is a diagrammatic illustration similar to FIGURE 12 showing the manner in which longitudinal forces are exerted on the beam by a wheel rolling over the beam at the midpoint of the span thereof;

FIGURE 14 is a diagrammatic illustration showing the locations of the load sensing strain gauges and the compensating strain gauges on the bottom surface of the beam;

FIGURE 15 is a diagrammatic illustration of the beam of FIGURE 14 showing the vertical deflection of the neutral axis of the beam as the wheel rolls therealong;

FIGURE 16 is a diagram showing the strains in the beam of FIGURE 15 at the points of location of the strain gauges secured to the beam on each of the strain gauges as the wheel rolls along the beam;

FIGURE 17 is a diagrammatic illustration of an electric circuit including the strain gauges of the beam of FIGURE 4 connected to form an electric bridge whose output varies in accordance with the strains in the beam at the points of location of the strain gauges as the load rolls therealong;

FIGURE 18 is a diagram showing the manner in which the theoretical resistances of the strain gauges connected in the bridge of FIGURE 17 vary and are combined to provide a theoretical output voltage which varies in accordance with the load imposed on the beam as the wheel rolls thereover;

FIGURE 19 is an illustration of the actual voltage output of the bridge of FIGURE 17 due to the variations in the resistances of the individual strain gauges;

FIGURE 20 is a schematic illustration showing the manner in which a pair of wheels connected to one axle of a vehicle, such as a railway car, move simultaneously over a pair of weigh rails of the invention constituting aligned sections of a pair of track rails; and, FIGURE 21 is a schematic illustration showing the manner in which the strain gauges of the weigh rails illustrated in FIGURE 20 are connected in an electric circuit to provide an output voltage which varies in accordance with the load imposed on the weigh rails as the wheels roll over the weigh rails.

Referring now particularly to FIGURES 1 through 4 of the drawing, the weighing apparatus 30 embodying the invention is shown in the form of a weigh rail or beam 31 mounted on a rigid foundation 32, which may be of concrete or other suitable material. The weigh rail extends between the adjacent spaced ends of the sections 34 and 35 of a rail track along which the wheel 36 may roll. The weigh rail or beam 31 has a pair of horizontal support pins 38 and 39 rigidly secured thereto, as by welding, which extend perpendicularly relative to and intersect the neutral axis NA of the weigh rail. The axes of the pins 38 and 39 are also in the vertical plane of the end surfaces of the weigh rail. The opposite end portions of the pin 38 extend into suitable bearings, such as roller bearings, of the pillow blocks 40 and 41 rigidly secured to opposite sides of a base plate 42 in any suitable manner as by means of the bolts 43. The opposite end portions of the pin 39 similarly extend into suitable bearings of the pillow blocks 44 and 45 rigidly secured to opposite sides of the base plate 43 by means of the bolts 46. The support pins 38 and 39 are thus rotatably mounted in the pillow blocks to permit free downward deflection of the beam as the load moves across its upper load bearing surface or tread 49 of the beam. The bearings are of any suitable type which prevent axial movement of the pins in the bearings. The base plate 42 and the pillow blocks are mounted on the upper support surfaces of the transversely extending I beams 47 and 48 whose lower portions are embedded in the foundation 32.

The end portions of the rails 34 and 35 on opposite ends of the weigh rail 31 curve arcuately downwardly as at 50 and 51 in order to clear the support pins 38 and 39 and have upper vertical end surfaces or portions 53 and 54 spaced from the adjacent end surfaces of the weigh rail so that the track rails do not in any manner engage the weigh rail and therefore impose no forces thereon, such as those which might otherwise be imposed thereby due to expansion and contraction of the track rails due to temperature changes.

The track rails are rigidly secured to the upper ends of the vertical I-beams 56 whose lower end portions are embedded in the concrete base 32 and whose upper end portions extend above the upper surface of the concrete base, the bottom flanges 58 of the track rails resting on the upper end of the beams being rigidly secured thereto in any suitable manner, as by the welds 60. The track rails may be the usual standard T-rails and have a head portion 61, the web 62 and the bottom flange 58. The track rails are tilted slightly as is the usual practice by providing the I-beams 56 with inclined upper end surfaces. The upper arcuate surfaces of the heads 61 of the rails provide the load supporting surface or tread 65 which is positioned in exact alignment with the tread or support surface 66 of the weigh rail so that a wheel rolling from one rail, for example the track rail 34 onto the weigh rail will not be displaced either vertically or transversely since the treads or load supporting surfaces of the rails are in exact alignment.

The weigh rail may be substantially rectangular in cross-sectional configuration having an upper slightly rounded surface providing the longitudinally extending tread 66 which is engageable by the tapered peripheral surface or rim 72 of the wheel which also has the usual flange 73. The tread 66 of the weigh rail is disposed directly over the neutral axis NA of the beam and the center of gravity of the beam lies at the intersection of the neutral axis NA, the central vertical axis Y—Y, and the transverse axis Z—Z so that when the weigh rail, which is supported only at its ends, is caused to bend or deflect downwardly due to the imposition of a downwardly acting vertical force, as by the wheel 36 rolling over its tread 66, at the point $g$ will be moved to a position directly below its normal position, when the wheel is directly above the point $g$, with the degree of such vertical displacement being proportional to the weight imposed on the weigh rail by the wheel.

The planar bottom surface 75 of the weigh rail extends parallel to the tread 66. A pair of strain sensing devices such as the strain gauges 77 and 78 are bonded in any suitable manner to the bottom surface of the weigh rail. The electrical resistance of the strain gauges varies directly as the strain of the weigh rail at the points at which the load sensing strain gauges 77 and 78 are secured to the weigh rail due to the longitudinal elongation of the bottom of the rail due to downward bending. The load sensing strain gauges 77 and 78 are spaced equally from the midpoint or central vertical axis Y—Y of the span of the beam or weigh rail 31.

An additional pair of temperature compensating strain gauges 79 and 80 are also bonded to the bottom surface 75 of the weigh rail whose electrical resistances decreases as the rail bends downwardly during the passage of a load thereover and the transverse width of the rail at the points of location of the strain gauges decreases in accordance with Poisson's ratio. The manner in which the strain gauges 79 and 80 compensate for the variations in the strain imposed on the load sensing strain gauges 77 and 78 due to contraction and expansion of the weigh rail with changes in temperature will be explained below.

A microswitch 85, rigidly secured to one side of the base plate 42 by means of the support bracket 87 whose lower end is rigidly secured to the base plate by means of the bolts or screws 88, has an operator rod 89 provided with a transversely extending stub shaft 90 on which is rotatably mounted the roller 91. The roller 91 extends upwardly into the path of travel of the rim 72 of the wheel 36 laterally outwardly of the weigh rail and is engaged thereby to close the microswitch as the point of contact of the wheel with the rail moves to the midpoint M at the central vertical axis Y—Y of the span of the weigh rail for a purpose to be described below.

Referring now particularly to FIGURE 5 of the drawing, the downward deflection of the weigh rail, and therefore the strain which occurs at the bottom surface 75 of the rail 31 as the wheel 36 rolls along the length thereof in the direction indicated in FIGURE 5, caused by the downwardly directed vertical force due to the load or weight imposed on the beam on the rail as the wheel rolls therealong, progressively increases as the wheel rolls from the track rail 34 toward the track rail 35 to a maximum as it reaches the midpoint of the span of the beam and over the point g which lies at the intersection of the neutral axis NA, the vertical central axis Y—Y and the transverse axis Z—Z of the beam and then progressively decreases until the wheel moves off the weigh rail and onto the track rail 35. The downward deflection of the neutral axis of the weigh rail to the position indicated by the broken line NA' creates a stress in the weigh rail fibers at the bottom surface of the rail which will be a tensile stress since the bottom surface of the rail is elongated due to such bending. As indicated in FIGURE 5, the distances X2 and X3 from the vertical center line Y—Y to the points of location of the strain gauges 78 and 79 are equal and the midpoint M of the area of the rail is equidistant from the axes of the support pins 37 and 38. At any particular point of travel of the wheel over the weigh rail, the tensile stress at the bottom surface 75 is greatest immediately below the point R of contact of the rim 72 of the rail wheel with the tread or supporting surface 66 of the weigh rail. As soon as the wheel moves from the track rail 34 onto the weigh rail immediately above the central axis of the pin 37 and along the weigh rail, the stress at the points of location of the strain gauges 77 and 78, and therefore the resistances of the strain gauges, begins to increase in the manner indicated in FIGURE 6. The resistance of the strain gauge 77, as shown by the curve 77a, increases to a peak, as at 100, and then decreases until the point of contact of the rim of the wheel reaches the position directly over the central axis of the pin 38 and then moves off the weigh rail. The resistance of the strain gauge 78, as indicated by the curve 78a, as the point of contact of the wheel with the tread 66 of the weigh rail moves directly above the point of location of the strain gauge 78 increases to a peak, as at 101, and then decreases rapidly as the wheel moves to the position wherein it engages the tread 66 immediately above the central axis of the pin 38 and then moves off onto the track rail 35. The theoretical combined resistance, curve 102, of the two strain gauges, and therefore the combined stresses of the weigh rail at the locations thereof, rises to a high value, as at 103, when the point of contact R of the wheel with the tread 66 is directly above the point of location of the strain gauge 77 and then remains constant until the wheel moves to the position directly above the strain gauge 78, as at 104, and then decreases rapidly. Inasmuch, however, as the local forces and effects created by the load imposed by the wheel on the weigh rail at its point of contact R with the tread 66 and transmitted through the rail to the strain gauges, modify or alter the strain measured by the strain gauges in the manner illustrated in FIGURE 6 wherein the curves 77b and 78b indicate the actual resistances of the strain gauges 77 and 78, and therefore the strain of the weigh rail, at the points of location of the strain gauges and the curve 102b shows their actual combined resistance, as the wheel rolls along the length of the weigh rail. The combined resistance of the two strain gauges is directly proportional to the downward deflection of the weigh rail and therefore of the load imposed thereon by the wheel 36 only when the wheel is at the midpoint M of the span of the weigh rail since such local effects have no or a minimal influence on the resistance of the strain gauges which are then spaced longitudinally from the point of contact of the wheel with the weigh rail. Such local effects are caused by the depression formed in the top surface of the weigh rail at the point R of contact of the wheel with the rail and the consequent protuberance or convexity of the bottom surface 75 immediately therebelow. If a single strain gauge were bonded to the under surface 75 of the weigh rail at the midpoint of the span of the weigh rail, the output of such strain gauge would be affected by such local effects and since such local effects vary with many factors, other than the weight of the load, the strain measured by such strain gauge would not accurately deflect the weight of the load imposed on the weigh rail.

The strain gauges 77 and 78 are connected in a suitable bridge network 110, FIGURE 8, in such a manner that the increase in the resistance of the strain gauges increases the unbalance of the bridge network and increases the voltage output of the bridge. One side of the strain gauge 77 and one side of a resistance 111 are connected to one input point or terminal 112 by the conductors 113 and 114, respectively. The input terminal 111 may be connected to one side of any suitable source of direct voltage, such as the battery 115, by the conductor 117. The other sides of the strain gauge 77 and the resistance 111 are connected by the conductors 119 and 120 to the output terminals 121 and 122, respectively, of the bridge network. One side of the strain gauge 78 and one side of the resistance 124 are connected to the other input point or terminal 125 of the bridge network by the conductors 126 and 127, respectively, and their other sides are connected to the output terminals 121 and 122 of the bridge network by the conductors 129 and 130, respectively. The input terminal 125 is connected to the other side of the source 115 of direct voltage by the conductor 132. The resistances 111 and 124 are equal in value so that the output of the bridge network varies directly with the changes in the resistances of the strain gauges. The resistances of the two strain gauges are also equal under normal conditions, i.e., no load is on the weigh rail. If necessary, suitable calibrating resistances may be connected in the bridge in any well known manner to balance the bridge and to ensure that the output of the bridge is zero or a desired minimum value under no load conditions.

The output terminals 121 and 122 of the bridge network 110 are connected by means of the conductors 133 and 134 to a suitable computer device 135 which translates the increase in the voltage output of the bridge network as a load is imposed on the weigh rail into a preferably direct indication of the weight of the load imposed on the weigh rail by the wheel as it rolls thereover. Such computer device may include an analog to digital converter of any suitable type whose output may then energize a suitable indicator, recorder, or the like, to give a direct reading of the weight of the load in pounds or other suitable weight units. In order that such computer device operate only at the time when the combined change or increase in the resistances of the strain gauges 77 and 78 from their normal values most correctly reflects the weight of such load, i.e., when the load is at the midpoint of the span of the weigh rail, the computer device is triggered at such time by the microswitch 85 which is connected in a suitable control circuit of the computer device by the conductors 137 and 183. It will be apparent that since the strain gauges 77 and 78 are in opposite arms on the bridge network, an increase in the resistance of either strain gauge causes an increase in the output of the bridge and that a decrease in the resistance of either strain gauge decreases the output of the bridge network. A normal or base value of the output voltage is preferably present across the output conductors 133 and 134 of the bridge network when a wheel is not on the weigh rail and the computer device detects the difference between such base value and the value of the output voltage of the bridge network at the time the wheel is at the midpoint M of the weigh rail due to the closure of the microswitch 85, and translates such difference into an indication of the weight of the load imposed on the weigh rail by the wheel.

It will therefore now be apparent that by positioning the strain gauges 77 and 78 at positions remote and equally spaced from the midpoint M of the span of the weigh rail and measuring the increase in the combined resistances of the strain gauges as the wheel is at the midpoint, a very accurate determination of the weight of the load imposed on the weigh rail is obtained since the strain gauges do not then reflect any of the local stress effects to which the weigh rail is subjected due to the force exerted on its support surface or tread 66 by the wheel at the point R of contact of the wheel with the tread, it being apparent that at such point of contact the upper surface of the weigh rail is somewhat depressed and this results in the transmission of stresses to the lower surface 75 of the weigh rail immediately below such point of contact and a slight bulging out or convexity thereof.

The measurement by the strain gauges 77 and 78 of the stresses imposed on the weigh rail by the load when the load is at the midpoint of the weigh rail is also desirable because at this time the effects of forces imposed on the rail by the wheel as it rolls along the tread 66 thereof and acting in other than vertical directions are minimal in value or effect the strain gauges 77 and 78 in such a way that they do not change the combined resistances of these strain gauges since if they cause the resistance of one strain gauge to increase they simultaneously cause the resistance of the other strain gauge to decrease. For example, the drag force P which acts axially longitudinally on the weigh rail, FIGURE 9, tends to cause axial compression of the weigh rail ahead of the point R of contact of the wheel with the rail and tends to stretch or impose a longitudinal axial tensile stress on the weigh rail rearwardly of the point R of contact of the wheel with the weigh rail since the ends of the beams of the weigh rail cannot move due to the mounting of the support pins 37 and 38 in their pillow blocks. As a result, when the point R of contact of the wheel is in the position shown in FIGURE 9, the center of gravity of the weigh rail is displaced longitudinally in the direction of movement of the wheel, as indicated by the point g' in FIGURE 9. The theoretical effect on the resistances of the strain gauges 77 and 78 of such drag force P is illustrated in FIGURE 10. When the wheel moves from the track rail 34 onto the weigh rail above the central axis of the support pin 37, the resistances of both strain gauges 77 and 78 as indicated by the curves 77c and 78c, respectively, immediately decrease since the whole length of the rail is immediately placed under axial longitudinal compression. The resistance of the strain gauge 77 remains at this decreased value until the point of contact of the wheel with the weigh rail moves directly above the point at which the strain gauge 77 is located on the bottom surface 75 of the weigh rail at which time the resistance of the strain gauge 77 immediately increases, to a value above its normal value, as from the point 140 to the point 141, and then remains constant until the wheel moves off the tread of the weigh rail and onto the tread of the track rail 35 at which time the resistance of the strain gauge immediately decreases, as at 150 back to its normal value. The resistance of the strain gauge 78c also decreases to the same degree as the resistance of the strain gauge 77 as the wheel moves onto the tread 66 of the weigh rail and remains at this decreased value until the point of contact of the wheel with the weigh rail moves directly above the point at which the strain gauge is located. At this time the resistance of the strain gauge increases immediately to a value above its normal value, as from the point 151 to the point 152, and then remains constant until the wheel moves off the tread of the weigh rail and onto the tread of the track rail 35 at which time the resistance of the strain gauge 78 immediately decreases, as at 150, back to its normal value. The combined or resultant resistance of the resistances of the strain gauges 77 and 78 is shown by the curve 155. The increase in the resistance of the strain gauge 77 from its normal value during the time at which the wheel is at the midpoint M of the span of the weigh rail is exactly equal to the decrease in the resistance of the strain gauge 78c at this time so that the drag force which acts axially longitudinally on the weigh rail affects the resistances of the two strain gauges equally but in opposite directions and their combined resistance at such time does not change. The drag force P which acts axially on the weigh rail therefore does not affect the output of the bridge network 110 at the time when the wheel is at the midpoint M of the span and output voltage of the bridge network 133 will remain proportional only to the load. The curves 77d and 78d of FIGURE 11 show the actual changes in the resistances of the strain gauges 77 and 78 due to the drag force P which acts axially longitudinally of the weigh rail as the wheel rolls thereover and the curve 155b shows the actual combined resistance change in the resistances of the two strain gauges.

In FIGURES 9 through 11, the drag force P has been shown as acting in the direction of movement of the wheel across the weigh rail. If the wheel is subjected to acceleration forces during its movement across the weigh rail, the drag force P acting axially longitudinally of the weigh rail will tend to cause axial longitudinal compression of the portion of the weigh rail rearwardly of the point of contact R of the wheel and will simultaneously tend to cause axial longitudinal tension or stretching of the portion of the weigh rail forwardly of such point of contact. The effect on the combined resistances of the drag force acting in such rearward direction on the strain gauges will cancel out in the same manner as the effect of the forwardly acting drag force P.

As illustrated in FIGURES 12 and 13, the drag force P will also impose or exert bending forces on the weigh rail 31. FIGURES 9 through 11 only considered the longitudinal axial effect of force P and now by superposition, FIGURES 12 and 13 only consider the bending effect of the same drag force P. When the point R of contact of the wheel with the weigh rail is at the point shown in FIGURE 12, the neutral axis NA of the weigh rail tends to move to the broken line position NA' since such bending force tends to deflect or move the portion of the beam rearwardly of the point of contact R upwardly and tends to deflect or move the portions forwardly of the point R downwardly. As a result, the strain gauge 77 is subjected to compression and its resistance decreases while the strain gauge 78 is subjected to tension and its resistance increases. When the point of contact R of the wheel is coincident or exactly at the same point as at the midpoint M of the span, as illustrated in FIGURE 13, the bending component of the drag force P acting axially longitudinally of the rail tends to move the neutral axis NA to the broken line position NA' position and move the rear portion of the weigh rail upwardly and the forward portion of the weigh rail downwardly equal distances whereby the decrease of the resistance of the strain gauge 77 due to the compression of the bottom surface 75 of the weigh rail at the point of location of the strain gauge 77 is exactly offset by an equal increase in the resistance of the strain gauge 78 due to the tension of the bottom surface 75 at the point of location of the strain gauge 78. Accordingly, when the point of contact of the wheel with the rail is at the midpoint M of the span of the weigh rail, the changes in the resistance of the two strain gauges due to such bending forces balance each other, due to symmetry of location, and therefore the output of the bridge network is not effected thereby and remains proportional to the load.

The weigh rail 31 may be subjected to forces acting parallel to the transverse axis Z—Z thereof but the effect of such transverse forces is very small compared to the vertical forces exerted by the load on the beam and their effect on the accuracy on the change of the voltage output of the bridge network is minimal and may be ignored.

It will therefore be seen that a new and improved weighing apparatus has been illustrated and described which employs a beam or weigh rail supported at longitudinally spaced locations whereby the weigh rail is free to deflect downwardly as a load moves thereover and that the strains in the bottom of the surface of the beam at points spaced equidistantly from the central vertical axis of the beam are measured at the time that the moving load is at the midpoint of the span of the weigh rail whereby the combined change in the strains at such points gives a true indication of the load supported by the beam.

It will further be seen that the strain of such points may be detected by such means as strain gauges bonded to the bottom surface of the rail at such points whose resistances will vary with the strain of the rail at such points.

It will further be seen that the strain gauges may be connected in a suitable electrical bridge network in such manner that the output of the bridge network will vary directly as the combined resistances of the two strain gauges and that the output of the strain gauge may be translated by a suitable computor device to give a direct indication of the weight of the load and that such computor device may include such amplifying means as may be necessary.

It will further be seen that the computer device may be caused to translate the output of the bridge network to an indication of the weight of the load on the weigh beam at the time that the moving load is at the midpoint of the span of the weigh rail between the two points of its support by the means of the switch 85 which closes when the load is at the midpoint of the span whereby the effects of extraneous forces caused by forces other than the vertical forces causing downward deflection of the rail due to the load thereon are cancelled out or are at minimum at the time the weight of the load is measured or determined.

As is illustrated in FIGURES 14, 15 and 16, the temperature compensating resistances 79 and 80 are also subjected to tension and compression due to the downward deflection of the weigh rail 31 as the wheel 36 rolls thereover. It will be apparent that as the wheel rolls off the track rail 34 and onto and over the weigh rail, the resistance of the strain gauge 79 decreases from its normal value, as illustrated by the vurve 79a until the point of contact R of the wheel is directly over the strain gauge 79, point 160, and then increases back to normal value as the wheel continues to roll along the weigh rail and finally off the weigh rail onto the track rail 35. The resistance of the strain gauge 79 decreases because as the bottom surface of the beam is placed under longitudinal tension due to the weight of the wheel, the fibers of the weigh rail at the bottom surface thereof are placed under transverse compression in accordance with Poisson's ratio. The resistance of the strain gauge 80, curve 80a, similarly decreases from its normal value until the point R of contact of the wheel with the rail is exactly above the point of location of the strain gauge 80 at which time the resistance of the strain gauge 80 is at its lowest value, as at 161, and then increases to its normal value as the wheel rolls off the weigh rail. The strain gauges 79 and 80 are connected in the bridge network 165 in such manner that when the resistance of the strain gauges 77 and 78 increases with a rise in temperature and therefore with the expansion of the weigh rail 31, and tend to unbalance the bridge network and increase the output thereof, the simultaneous increase in the resistances of the strain gauges 79 and 80 act in the opposite direction to tend to decrease the output of the bridge network and thus maintain the output of the bridge network at a desired normal value.

One side of each of the strain gauges 77 and 80 is connected to one input terminal 166 of the bridge network 165 by the conductors 167 and 168, respectively, and their other sides are connected to the output terminals 170 and 171 of the bridge network by the conductors 172 and 173, respectively. One side of each of the strain gauges 79 and 78 is connected to the input terminal 175 by the conductors 176 and 177 and their other sides are connected to the output terminals 170 and 171 by the conductors 178 and 179, respectively. The input terminals 166 and 175 are connected to opposite sides of a suitable source of direct current, such as the battery 180, by the conductors 181 and 182. The output terminals 170 and 171 of the bridge network are connected to a suitable computer device 135 by the conductors 184 and 185, respectively.

Since the resistances of the temperature compensating strain gauges 79 and 80 decrease as the load increases and since they are connected in the bridge network 165 indicated in FIGURE 17 in such manner as decrease in the resistances of these strain gauges tends to unbalance the bridge network and increase the voltage output thereof across the conductors 184 and 185, the temperature compensating strain gauges also tend to increase the output of the bridge network in accordance with the load as illustrated in FIGURE 18 wherein the curves 79e and 80e indicate the manner in which the voltage output of the bridge network is caused to vary by the strain gauges 79 and 80 as a load moves across the weigh rail and wherein the curves 77e and 78e show the manner in which the voltage output is caused to vary by the strain gauges 77 and 78. The combined or resultant change in the output of the bridge network 165 is indicated by the curve 188. The actual output of the bridge network 165 due to the combined effects of the four strain gauges as a wheel rolls over the weigh rail is illustrated by the curve 190 in FIGURE 19. It will be noted that due to local effects of the imposition of a load at the point R of contact of the wheel with the tread of the weigh rail, the actual curve of voltage output varies from the theoretical curve. The strain gauges 79e and 80e are used not only to provide temperature compensation, so that the normal value of the output of the bridge network 165 will not vary considerably with temperature but also to increase the amplitude of the variation of the output voltage or signal of the bridge network with load.

FIGURES 20 and 21 show the manner in which two weigh rails 31A and 31B, each identical in structure to the weigh rail 31 illustrated in FIGURES 1 through 4, may be similarly mounted between the spaced ends of adjoining sections of the usual pair of parallel track rails to simultaneously measure the weight of the load carried by the usual pairs of wheels 36A and 36B of a vehicle mounted on a common axle 190. The wheels 36A and 36B move across the midpoints of the spans of the two weigh rails substantially simultaneously since the axis of the axle 190 is parallel to the transverse axis Z—Z of the weigh rails. Since the points of contact of the two wheels with their respective weigh rails will be at the midpoints of the spans thereof at substantially the same time, the switch 85 actuated by one of the wheels will cause the computer device 135 to be connected to translate the voltage output of the bridge network 165a at the time that the points of contact of both wheels are at the midpoints of the spans of the two weigh rails.

The bridge network 165A is substantially similar to the bridge network 165. The strain gauges 77A and 77B being connected in series in one arm of the bridge between the input terminal 166A and the output terminal 170A by the conductors 167A, 191 and 173A. The strain gauges 78A and 78B are connected in series between the input terminal 175A and the output terminal 171A by the conductors 179A, 192 and 177A. The strain gauges 80A and 80B are connected in series between the input terminal 166A and the output terminal 171B by the conductors 168A, 194 and 173A. While the strain gauges 79A and 79B are connected between the input and output terminal 170A and 175A by the conductors 178A, 195 and 176A. The input terminals 166A and 175A are connected to a suitable source of direct voltage, such as the battery 180A, by the conductors 181A and 182A. The output terminals 170A and 171A are connected to a suitable computer device 135 by the conductors 184A and 185A. It will be apparent that the connection of the strain gauges in the manner indicated in the bridge network 165A will cause the voltage output of the bridge network 165A to vary as the combined loads imposed on the weigh rails 31a and 31b by the two wheels 36A and 36B mounted on a common axle 190 as they simultaneously roll along the two weigh rails and that the output voltage is translated by the computer device to a direct indication of the weight of the combined load when the points of contact of the two wheels 36A and 36B with the weigh rails 31a and 31b are at the midpoints of the spans of the two identical weigh rails.

It will thus be apparent that the weight of a vehicle, such as a railway car, may be determined by weighing the load of each pair of wheels having a common axle by means of the apparatus of the invention and then adding the loads of the plurality of pairs of wheels of the vehicle either by suitable adding device associated with the computer device or by adding in any other suitable manner the loads, as indicated by the computer device, or weight of the pairs of wheels of the vehicle.

It will now be seen that a new and improved apparatus for weighing loads has been illustrated and described which includes a beam supported at longitudinally spaced locations, and preferably at the ends thereof, so that the portion of the beam between its points of support is free to deflect downwardly as a load moves along the length thereof, and strain or deflecting sensing and measuring means to sense the strain or downward vertical deflection of the beam, which is proportional to the weight of the load moving along the rail.

It will further be seen that the beam is supported for free or pivotal movement at the spaced locations, as by the rotatable mounting of pins rigidly secured to the beam, so that the beam is free to deflect downwardly between the pins and the degree of its deflection is not affected by any restraint tending to prevent such pivotal movement.

It will further be seen that the strain or vertical deflection of the beam is measured at the time that the load is spaced equidistantly between two spaced strain or deflection sensing means such as the strain gauges bonded to the bottom surface of the beam whereby local effects of the load on the beam have no or very minimal effect on the strain or deflection sensing devices or means.

It will be further seen that the strain at the bottom surface of the beam is directly proportional to the deflection of the beam so that the strain gauges detect or sense and measure the downward deflection of the beam.

It will further be seen that a means, such as the switch 85, has been provided to cause the strain or deflection at the points of location of the sensing means to be measured at the time the moving load is at a point equidistant between the two points of support.

A further object of the invention is to provide a weighing apparatus wherein the points of location of support of the beam as well as the sensing means are spaced equidistant from an on opposite sides of the midpoint of the span of the beam in order that the effects of forces acting in directions other than the vertical and imposed on the beam by the load moving therealong may be balanced out in a proper electrical bridge network in which the sensing means are connected or be minimal at the time when the strain or vertical deflection of the beam is measured.

It will also be seen that the sensing means may be strain gauges bonded to the bottom surface of the weigh rail of the beam whose resistances vary with the strain or downward vertical deflection of the beam which are connected in an electrical bridge network in such manner that the increase in the resistances of the strain gauges due to the strain imposed by the load will cause an unbalance of the bridge network and a resultant increase in its output which is directly proportional to the weight of the load.

It will also be seen that the weighing apparatus may include additional temperature compensating strain gauges bonded to the bottom surface of the beam and spaced equidistant from and on opposite sides of the midpoint of the span of the beam which are so connected in the bridge network that the variation in the resistances of the temperature compensating strain gauges due to changes in temperature counter-balance the like variations in the resistances of the primary strain gauges whereby the normal or base output of the bridge network is maintained substantially constant regardless of the changes in the temperature to which the beam is subjected.

It will also be seen that the temperature compensating strain gauges are so connected in the bridge network that the changes in their resistances due to the strain or downward deflection of the beam caused by the rail will also unbalance the bridge network and cause its output to increase in direct proportion to the weight of the load.

While for the purpose of illustrating the manner in which the weighing apparatus of the invention functions, the support pins 36 and 37 have been shown secured to the weigh rail at the neutral axis of the weigh rail, since when the weigh beam is supported at its neutral axis the vertical deflection of the beam varies substantially linearly with the load, it will be apparent that the weigh rail may be supported at points other than the neutral axis. For example, the bottom surface of the beam could rest upon the support pins and be rigidly secured thereto. In this case, the strain at the bottom surface of the weigh rail or the downward deflection thereof would not vary linearly with the load, because the pins would tend to spread apart longitudinally when the beam bends and this spreading of the pins would tend to be restrained by the roller bearings and pillow blocks. In practical applications, however, the non-linearity of the vertical deflection with the load over a selected range of load of the beam to be measured or weighed is substantially linear and the rail therefore can be supported at such points located elsewhere than at its neutral axis.

While the weighing apparatus has been illustrated and described in comprising a weigh rail for weighing a load imposed on the weigh rail by a wheel rolling therealong, it will be apparent that the load could slide therealong, and that the beam may constitute any suitable platform supported at spaced positions for measuring such loads as a wheel of a truck or automobile movable over the platform and that while a mechanical switch has been shown for causing the measurement of the output of the bridge network to be taken at the time the load is at the midpoint of the span of the beam other suitable means, such as photocells, could be employed to detect when the load is at the midpoint of the span and cause the measurement of the load at that instant.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A weighing apparatus for weighing a moving load including: a beam; means supporting said beam at longitudinally spaced locations whereby said beam is free to deflect downwardly as a load moves longitudinally over said beam; means for sensing the deflection of said beam at points spaced longitudinally equidistantly from and on opposite sides of the midpoint of the span of said beam between said spaced locations; and means operatively associated with said sensing means and responsive to the load when it is at the midpoint of the span for weighing the moving load when it is at the midpoint of the span.

2. An apparatus for weighing a moving load including: a beam; means spaced along the longitudinal axis of the beam for supporting the beam and permitting pivotal movement of the beam about transverse axes at the locations of support of the beam whereby the beam is free to deflect downwardly as a load moves longitudinally over the beam; and means for sensing the deflection of said beam at points spaced longitudinally equidistantly from and on opposite sides of the midpoint of the span of said beam between said spaced locations.

3. An apparatus for weighing a moving load including: a beam; means spaced along the longitudinal axis of the beam for supporting the beam and permitting pivotal movement of the beam at the transverse axes at the locations of support of the beam whereby the beam is free to deflect downwardly as a load moves longitudinally over the beam; means for sensing the deflection of said beam at points spaced longitudinally equidistantly from and on opposite sides of the midpoint of the span of said beam between said spaced locations; and means operatively associated with said sensing means and responsive to the load when it is at the midpoint of the span for weighing the moving load when it is at the midpoint of the span.

4. A weighing apparatus for weighing a moving load including: a beam; means supporting said beam at longitudinally spaced locations whereby said beam is free to deflect downwardly as a load moves longitudinally over said beam; a pair of means for sensing the deflection of said beam at points spaced longitudinally equidistantly from and on opposite sides of the midpoint of the span of said beam between said spaced locations; and means operatively associated with said sensing means and responsive to the load when it is at the midpoint of the span for weighing the moving load when it is at the midpoint of the span.

5. An apparatus for weighing a moving load including: a beam; means spaced along the longitudinal axis of the beam for supporting the beam and permitting pivotal movement of the beam about transverse axes at the locations of support of the beam whereby the beam is free to deflect downwardly as a load moves longitudinally over the beam; and a pair of means for sensing the deflection of said beam at points spaced longitudinally equidistantly from and on opposite sides of the midpoint of the span of said beam between said spaced locations.

6. An apparatus for weighing a moving load including: a beam; means spaced along the longitudinal axis of the beam for supporting the beam and permitting pivotal movement of the beam at the transverse axes at the location of support of the beam whereby the beam is free to deflect downwardly as a load moves longitudinally over the beam; a pair of means for sensing the deflection of said beam at points spaced longitudinally equidistantly from and on opposite sides of the midpoint of the span of said beam between said spaced locations; and means operatively associated with said sensing means and responsive to the load when it is at the midpoint of the span for weighing the moving load when it is at the midpoint of the span.

7. A weighing apparatus including: a beam; support means spaced longitudinally of said beam for supporting said beam and permitting downward deflection of said beam between said supporting means as a load moves over said beam; a pair of strain gauges secured to the bottom of said beam on opposite sides of the midpoint of span of said beam between said support means and spaced equidistantly from the midpoint, the resistances of the strain gauges increasing with the downward deflection of said beam; and an electric bridge network providing an output, said strain gauges being connected in said bridge network to vary the output of said network in accordance with the weight of the load moving across said beam.

8. A weighing apparatus including: a beam; support means spaced longitudinally of said beam for supporting said beam and permitting downward deflection of said beam between said supporting means as a load moves over said beam; a pair of strain gauges secured to the bottom of said beam on opposite sides of the midpoint of span of said beam between said support means and spaced equidistantly from the midpoint, the resistances of the strain gauges increasing with the downward deflection of said beam; an electric bridge network providing an output, said strain gauges being connected in said bridge network to vary the output of said network in accordance with the weight of the load moving across said beam; and means translating the change in output of said electric bridge network into an indication of the weight of the load moving across said beam.

9. A weighing apparatus including: a beam; support means spaced longitudinally of said beam for supporting said beam and permitting downward deflection of said beam between said supporting means as a load moves over said beam; a pair of strain gauges secured to the bottom of said beam on opposite sides of the midpoint of span of said beam between said support means and spaced equidistantly from the midpoint, the resistances of the strain gauges increasing with the downward deflection of said beam; an electric bridge network providing an output, said strain gauges being connected in said bridge network to vary the output of said network in accordance with the weight of the load moving across said beam; means translating the change in output of said electric bridge network into an indication of the weight of the load moving across said beam; and means operably associated with said beam and said network for causing said translating means to indicate the weight of the load when the moving load is at the midpoint of the span of said bridge.

10. A weighing apparatus including: a beam; support means spaced longitudinally of said beam for supporting said beam and permitting downward deflection of said beam between said supporting means as a load moves over said beam; a pair of strain gauges secured to the bottom of said beam on opposite sides of the midpoint of span of said beam between said support means and spaced equidistantly from the midpoint, the resistances of the strain gauges increasing with the downward deflection of said beam; an electric bridge network providing an output, said strain gauges being connected in said bridge network to vary the output of said network in accordance with the weight of the load moving across said beam; means translating the change in output of said electric bridge network into an indication of the weight of the load moving across said beam; and a pair of temperature compensating strain gauges secured to the bottom surface of said beam and spaced longitudinally equidistantly on opposite sides and from the midpoint of the span of said beam, said temperature compensating strain gauges being connected in said bridge network, the resistances of said temperature compensating strain gauges varying directly with the temperature of said beam and with the weight of the load moving over said beam, said temperature compensating resistances being connected in said bridge network to tend to cause the output of said bridge network to decrease with increase in temperature and to increase with the weight of the load.

11. A weighing apparatus for weighing the weight of a pair of wheels mounted for rotation about a common axis and moving over a pair of parallel track rails including: a pair of weigh rails constituting sections of said track rails, said weigh rails constituting parallel aligned sections of a pair of track rails, support means for each of said weigh rails permitting downward deflection of said weigh rails as a pair of wheels of a vehicle rolls simultaneously over said weigh rails; a pair of strain gauges secured to the bottom of each weigh rail on opposite sides of the midpoint of span of each weigh rail and spaced equidistantly from the midpoint, the resistances of the strain gauges of each weigh rail increasing with the downward deflection of the weigh rail; and an electric bridge network providing an output, said strain gauges being connected in said bridge network to vary the output of the bridge network in accordance with the weight of the load imposed on the weigh rails by the wheels moving across said weigh rails.

12. A weighing apparatus for weighing the weight of a pair of wheels mounted for rotation about a common axis and moving over a pair of parallel track rails including: a pair of weigh rails constituting sections of said track rails, said weigh rails constituting parallel aligned sections of a pair of track rails, support means for each of said weigh rails permitting downward deflection of said weigh rails as a pair of wheels of a vehicle rolls simultaneously over said weigh rails; a pair of strain gauges secured to the bottom of each weigh rail on opposite sides of the midpoint of span of each weigh rail and spaced equidistantly from the midpoint, the resistances of the strain gauges of each weigh rail increasing with the downward deflection of the weigh rail; an electric bridge network providing an output, said strain gauges being connected in said bridge network to vary the output of the bridge network in accordance with the weight of the load imposed on the weigh rails by the wheels moving across said weigh rails; and means for translating the change in output of said electric bridge network into an indication of the weight of the load moving across said weigh rails.

13. A weighing apparatus for weighing the weight of a pair of wheels mounted on a common axle and moving over a pair of parallel track rails including: a pair of weigh rails constituting sections of said track rails, said weigh rails constituting parallel aligned sections of a pair of track rails, support means for each of said weigh rails permitting downward deflection of said weigh rails as a pair of wheels of a vehicle rolls simultaneously over said weigh rails; a pair of strain gauges secured to the bottom of each weigh rail on opposite sides of the midpoint of span of each weigh rail and spaced equidistantly from the midpoint, the resistances of the strain gauges of each weigh rail increasing with the downward deflection of the weigh rail; an electric bridge network providing an output, said strain gauges being connected in said bridge network to vary the output of the bridge network in accordance with the weight of the load imposed on the weigh rails by the wheels moving across said weigh rails; means for translating the change in output of said electric bridge network into an indication of the weight of the load moving across said weigh rails; and means operably associated with said weigh rails and said network for causing said translating means to indicate the weight of the load when the moving load is at the midpoint of the span of said bridge.

References Cited in the file of this patent

UNITED STATES PATENTS 2,793,851    Ruge _____ May 28, 1957

FOREIGN PATENTS 221,285    Austria _____ May 10, 1962
974,974    France _____ Oct. 4, 1950

OTHER REFERENCES

Strain Gage Primer, by Perry & Lissner, McGraw-Hill, 1950, pp. 56–65.